United States Patent [19]

Prause et al.

[11] 3,715,475

[45] Feb. 6, 1973

[54] METHOD AND APPARATUS FOR ELECTRICALLY TRANSMITTING PICTURES

[75] Inventors: Dieter Prause, Esslingen/Neckar; Rolf Sost, Stuttgart, both of Germany

[73] Assignee: Robert Bosch Elektronik GmbH, Berlin, Germany

[22] Filed: April 27, 1971

[21] Appl. No.: 137,757

[30] Foreign Application Priority Data

April 28, 1970 Germany....................P 20 20 639.7

[52] U.S. Cl.........................178/5, 178/6, 178/6.6 R, 178/DIG. 3

[51] Int. Cl.............................H04n 1/02, H04n 7/12

[58] Field of Search........178/5, DIG. 3, 6.6 B, 6.6 R, 178/6

[56] References Cited

UNITED STATES PATENTS

| | | | |
|---|---|---|---|
| 3,499,108 | 3/1970 | Simon | 178/6.8 X |
| 3,294,896 | 12/1966 | Young, Jr. | 178/5 |
| 3,432,661 | 3/1969 | Hodgkinson | 178/5 X |
| 3,604,846 | 9/1971 | Behane et al. | 178/6 X |
| 3,482,039 | 12/1969 | Valentin et al. | 178/6.6 B |
| 3,393,269 | 7/1968 | Zeuthen | 178/6.6 |

*Primary Examiner*—Howard W. Britton
*Attorney*—Spencer & Kaye

[57] ABSTRACT

Apparatus for transmitting pictures by scanning the picture at the transmitting end to produce a voltage proportional to the brightness value of each picture element, associating the voltage for each element with a predetermined signal corresponding to the amplitude range in which that voltage lies, transmitting the predetermined signal, and, at the receiving end causing each signal to actuate a corresponding pulse sequence whose pulse duration to the pulse interval ratio is proportional to the voltage range with which its signal is associated.

1 Claim, 8 Drawing Figures

Inventors.
Dieter Prause
Rolf Sost
BY Spencer & Kaye
ATTORNEYS

Inventors
Dieter Prause
Rolf Sost
BY Spencer & Kaye
ATTORNEYS.

METHOD AND APPARATUS FOR ELECTRICALLY TRANSMITTING PICTURES

BACKGROUND OF THE INVENTION

The present invention relates to apparatus for electrically transmitting pictures having black, white and gray brightness values by photoelectrically scanning the picture at the transmitting end to produce a scanning voltage which is proportional to the respective brightness values and which controls at the receiving end a device for reproducing the picture, e.g. a facsimile writer which produces only black values and white values.

A facsimile system may serve, inter alia, for the electric transmission of a picture containing black, white and gray brightness values, e.g. a photograph, the system including a picture transmitter and a picture receiver. At the transmitting end the picture is scanned in a line-by-line fashion by means of a photoelectric scanner and a picture signal voltage obtained from this scanning and proportional to the relative brightness value of each picture element is emitted. At the receiving end, a facsimile writer which is controlled by the picture signal voltage records a reproduction of the picture in synchronism with the scanning.

Since conventional facsimile writers are able to reproduce only black and white values, all brightness values between the white value and, for example, a medium gray in the picture appear as white and all brightness values between that medium gray and the black value appear as black.

While a limitation to the reproduction of only black and white values would not constitute a drawback for pictures to be transmitted which exhibit only black and white details, as for example technical drawings and documents, the loss of reproduction of gray values constitutes a substantial loss of information in the reproduction of pictures containing black, white and gray brightness values.

Picture receivers exist which include a facsimile writer capable of reproducing, in addition to the black value and the white value, also all gray values. However, such devices are relatively complicated so that their use is worthwhile only in special cases.

It has also been proposed to divide the analog scanning voltage, i.e. voltage proportional to the incremental brightness values, resulting from the line-by-line scanning of a picture into a sequence of amplitude ranges and to associate a certain pulse sequence with each amplitude range. In this case, the pulse sequences are distinguished by the sum of the pulse widths per unit time and higher amplitude ranges are associated with greater sums. Such pulse sequences permit the control of a facsimile writer, which is actually only able to reproduce black and white brightness values, in such a manner that its writing member causes a recording to be made only for the duration of the pulses so that amplitudes representing gray brightness values are recorded as a broken line which is integrated to a gray value by the eye of the observer.

In order for the gray values recorded by the facsimile writer to appear as uniform as possible to the eye of the observer, the pulse durations and pulse intervals of the pulse sequences must be as short as possible, i.e. they require a relatively wide bandwidth for transmission. Therefore, the usually limited channel capacity of the transmission path, e.g. a telephone line, between the picture transmitter and the picture receiver is a substantial impediment to the satisfactory utilization of this technique.

SUMMARY OF THE INVENTION

It is a primary object of the present invention to avoid these limitations.

A further object of the invention is to improve and simplify the electrical transmission of pictures.

Another object of the invention is to reduce the channel capacity required for transmitting pictures having a range of brightness values.

These and other objects according to the present invention are achieved by apparatus for the electrical transmission of pictures having black, white and gray brightness values according to which the scanning voltage produced at the transmitting end by line-by-line photoelectric scanning of the picture, which voltage is proportional to the picture element brightness values, controls a device at the receiving end, e.g. a facsimile writer which reproduces only black values and white values. According to the invention the amplitudes of the scanning voltage at the transmitting end are divided into a white range containing the low voltage amplitudes, a black range containing the high voltage amplitudes, and at least one gray range disposed between the white range and the black range and containing the medium amplitudes corresponding to the gray brightness values of the picture to be transmitted, each range has a difference discrete signal associated with it, the signals are transmitted, and the signals belonging to the gray range each actuate a pulse sequence at the receiving end for controlling the writer, and each pulse sequence having a different ratio of pulse duration to pulse interval, the smaller the amplitude of the scanning voltage which is associated with a signal, the smaller the ratios.

DESCRIPTION OF THE PREFERRED EMBODIMENTS

Figure 1A:
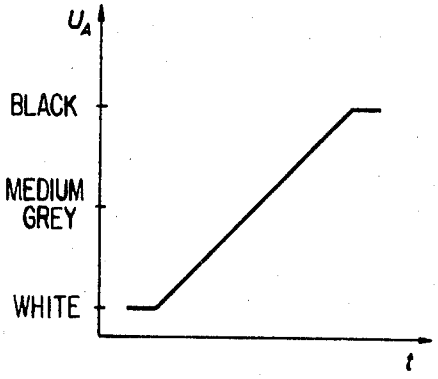
FIG. 1*a* is a diagram which shows the time sequence of a continuously increasing scanning voltage $U_A$.

In a facsimile system, a scanner of a picture transmitter, which scanner may be of the photoelectric type, performs a line-by-line scanning of a picture to be transmitted, which picture contains black, white and gray brightness values, and produces a scanning voltage which is proportional to the above-mentioned brightness values. During scanning of a line in which the brightness steadily varies from the "white" brightness value through the gray brightness values to the "black" brightness value , the scanning voltage $U_A$ will have the waveform shown in the diagram of FIG. 1*a*.

According to the objects of the present invention, not only the amplitudes of the scanning values which correspond to the black value and to the white value are to be transmitted from the picture transmitter to the picture receiver, but also at least a few gray values are also to be transmitted and reproduced at the receiving end so that the reproduction of the picture also shows shades of gray which constitute an increase in the amount of information transmitted.

Since present facsimile systems in picture receivers contain a facsimile writer which is able to reproduce only black and white picture details, the desired reproduction of gray can be obtained only through the use of special measures.

Figure 1B:
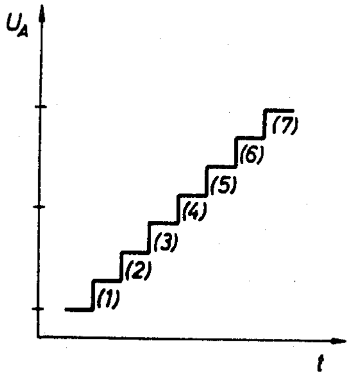
FIG. 1*b* shows a scanning voltage $U_A$ according to FIG. 1*a* divided into seven uniform ranges.

To this end, the scanning voltage $U_A$ is divided in the picture transmitter into a plurality of, for example seven, ranges as shown in FIG. 1*b*. A first range (1) covering the lowest amplitudes corresponding to the "white" brightness value and the last range (7) covering the highest amplitudes corresponding to the "-black" brightness value. Between the above-mentioned ranges (1) and (7) are disposed a plurality of other ranges (2), (3), (4), (5) and (6) which correspond to the different incremental gray values from light gray through medium gray to dark gray.

Each range has a different signal associated with it, e.g. a number, which can be reliably transmitted without interference, for example, in binary coded form between the picture transmitter and the picture receiver. The transmission channel is, for example, a telephone line or a broadcast channel. The available bandwidth of the transmission channel will be sufficient for the transmission of the numerical code even when the number of amplitude ranges into which the scanning voltage is divided is relatively large. Clearly, a code for seven amplitude ranges will create no difficulty and would require a binary word length of only three bits.

The signals received by the picture receiver are formed, at the receiver, into a train of pulse sequences for controlling a facsimile writer. The individual pulse sequences differ from one another by the fact that they each have a different ratio of pulse duration to pulse interval, the smaller the amplitude of the scanning voltage associated with the signal the smaller the ratio.

Since the writing member of the facsimile writer which is controlled by a pulse sequence effects a recording, i.e. produces a black region only during the occurrence of a pulse, each gray value is recorded as a broken line which is integrated into a gray value by the eye of the observer. Depending on whether a pulse sequence represents a large or a small sum of pulse durations $t_i$ per unit time, a darker or lighter gray results. FIGS. 2*a* to 2*e* illustrate the pulse sequence formed from different transmitted signals.

Figure 2A:
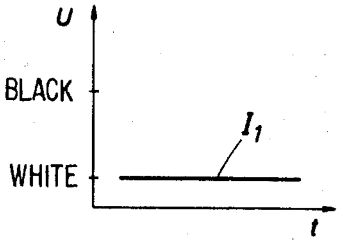
FIG. 2*a* is a diagram of a pulse sequence associated with a range which contains the amplitudes of the scanning voltage corresponding to the brightness value "white".

The signal associated with range (1) of FIG. 1*b* generates a pulse sequence $I_1$ at the receiving end which is shown in FIG. 2*a* and which consists of a low amplitude constant direct voltage corresponding to a continuous pulse interval. The writing element of the writer controlled by pulse sequence $I_1$ will not make any modification in a white recording carrier so that a white brightness impression results.

Figure 2B:
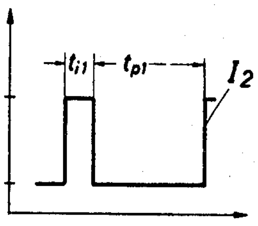
FIG. 2*b* is a diagram of a pulse sequence associated with a range which contains the amplitudes corresponding to the brightness value "light gray".

The signal associated with, for example, range (2) of FIG. 1*b* generates a pulse sequence $I_2$, shown in FIG. 2*b*, in the picture receiver which consists of a relatively short pulse duration $t_{i1}$ and a long pulse interval $t_{p1}$. The ratio of the length of pulse duration $t_{i1}$ to the length of pulse interval $t_{p1}$ per unit time is small in this case and the black recording produced only during the pulse duration $t_{i1}$ in conjunction with the adjacent white recording produced during the pulse intervals $t_{p1}$ produce a light gray brightness impression for the observer of the completed recording.

Figure 2C:
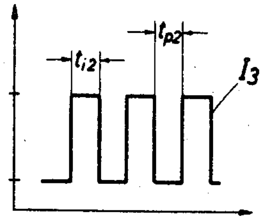
FIG. 2*c* is a diagram of a pulse sequence associated with a center range which contains the amplitudes corresponding to the brightness value "medium gray".

The signal associated with a medium gray range, e.g. range (4) of FIG. 1*b*, is converted in the receiver into the pulse sequence $I_3$ shown in FIG. 2*c*. This sequence has pulse durations $t_{i2}$ and pulse intervals $t_{p2}$ of identical lengths. A point on the recording produced by this pulse sequence appears to the observer as "medium gray".

Figure 2D:
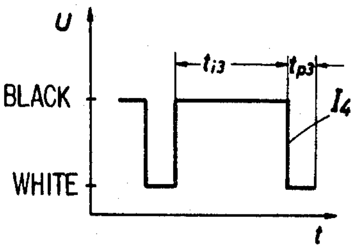
FIG. 2*d* is a diagram of a pulse sequence associated with a range which contains the amplitudes corresponding to the brightness value "dark gray".

In an analogous manner, a signal associated with, for example, range (6) of FIG. 1*b* produces the pulse sequence $I_4$ shown in FIG. 2*d*. This sequence has a relatively long pulse duration $t_{i3}$ and short pulse intervals $t_{p3}$, so that it produces a recorded brightness value which appears "dark gray" to the observer.

Figure 2E:
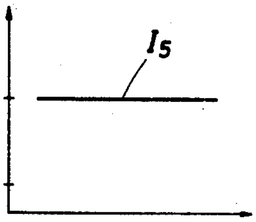
FIG. 2*e* is a diagram of a pulse sequence associated with a range which contains the amplitudes corresponding to the brightness value "black".

The signal associated with range (7) of FIG. 1*b* generates the pulse sequence $I_5$, shown in FIG. 2*e*, in the picture receiver. This corresponds to a higher amplitude constant direct voltage. The direct voltage controls the facsimile writer in such a manner that its writing member effects a black recording.

A further respective pulse sequence is derived from the signals associated with each one of ranges (3) and (5) of the scanning voltage. These pulse sequences are not shown to avoid repetition and because their form can be readily comprehended from the sequences illustrated. These last-mentioned pulse sequences each have a pulse duration to pulse interval ration which lies between that of pulse sequences $I_2$ and $I_3$ or $I_3$ and $I_4$, respectively, and they produce, during reproduction, a brightness impression between "light gray" and "medium gray" or a brightness impression between "medium gray" and "dark gray", respectively.

The shortest pulse durations, e.g. $t_{i1}$ and $t_{i2}$ or the shortest pulse intervals, e.g. $t_{p2}$ and $t_{p3}$, respectively, can be so dimensioned according to the present method that the eye of the observer can integrate the lines interrupted by blank spaces into shades of gray which are as uniform as possible. For this purpose, the shortest pulse duration or the shortest pulse interval, respectively, of all pulse sequences is selected to be as short as possible. The only limit is the resolution capability of the facsimile writer. This limit, however, in principle permits the use of a shorter pulse duration or pulse interval than could be employed if the pulse sequences were formed originally in the transmitter, in which case the shortest pulse duration or pulse interval to be transmitted over the transmission channel between the picture transmitter and the picture receiver would be limited by the relatively small channel capacity encountered in practice, e.g. that of a telephone line.

Figure 3:
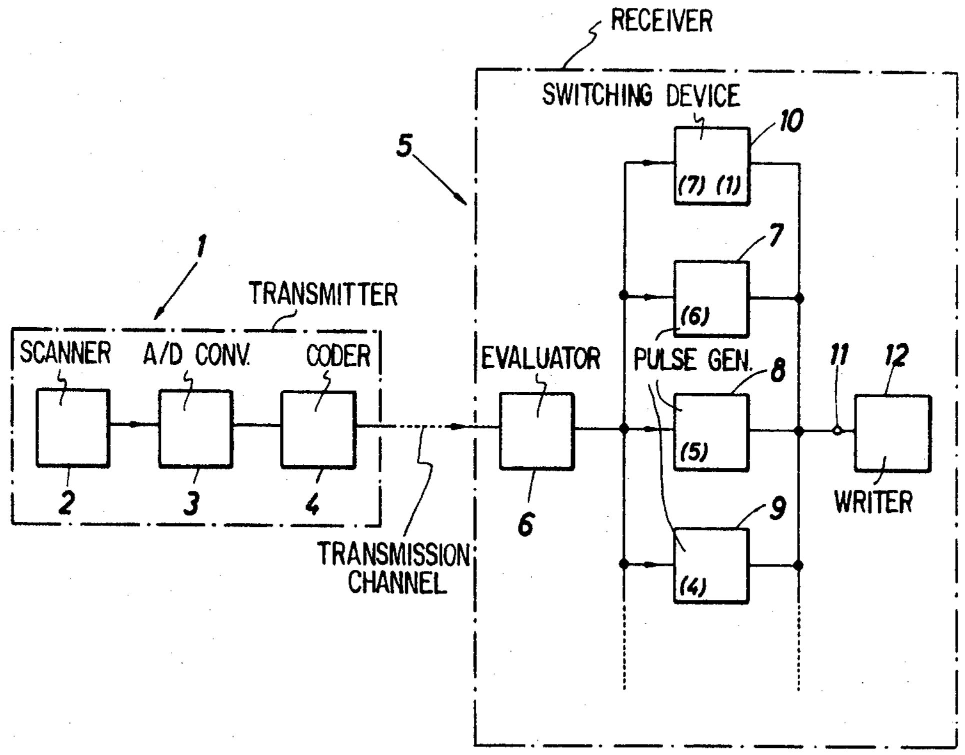
FIG. 3 is a simplified block circuit diagram of a picture transmitter and a picture receiver according to the present invention.

Regarding the circuitry for carrying out the invention, apparatus, for performing the above-described method, may be constructed, in principle, as shown in FIG. 3. This includes a scanner 2 connected in the picture transmitter 1 to furnish a scanning voltage, e.g. $U_A$ of FIG. 1*a*, during the line-by-line scanning of a picture to be transmitted and containing black, white and gray brightness values. The scanning voltage is proportional to the brightness value being scanned at each instant and is to be divided, or quantized, into a plurality of, e.g. seven, amplitude ranges, as shown in FIG. 1*b*. For this purpose an analog/digital converter 3 is provided which generates a certain signal depending on the amplitude range of the instantaneous value of the scanning voltage, e.g. a direct voltage associated with the respective amplitude range. The direct voltage is coded in a coding device 4, for example into a binary coded word depending on the level of the respective quantized direct voltage.

Since it is not the instantaneous values of the scanning voltage which are transmitted but rather only coded numbers representing the individual amplitude ranges, the speed of the line-by-line scanning of the picture to be transmitted can be relatively high without exceeding the upper limit of the channel capacity of the transmission channel between picture transmitter 1 and a picture receiver 5.

In the picture receiver 5 the received coded word is converted, by means of an evaluator 6, into a signal depending on the respective code word, e.g. into a direct voltage value which actuates a single respective one of pulse generators 7 to 9, each responsive only to a signal representing one particular code word. Pulse generators 7 to 9 represent less than all of the required pulse generators, their number depends on the number of quantized amplitude ranges into which the scanned picture voltage can be divided. No pulse generators are associated with the ranges containing the lowest and the highest amplitudes (1) and (7), respectively, of the scanning voltage. Rather there is provided a switching device 10 which furnishes, whenever the direct voltage value assigned to range (7) is at its input, a high direct voltage corresponding to the sequence of FIG. 2*e*, and, when the direct voltage value assigned to range (1) is present, a low direct voltage corresponding to the sequence of FIG. 2*a*. Pulse generators 7, 8, 9 automatically produce, upon receipt of the proper voltage from evaluator 6, the desired pulse sequences $I_2$, $I_3$, $I_4$, respectively, which differ from one another by their respectively different ratios of pulse duration to pulse interval. The outputs of the pulse generators and of the switching device 10 are connected to the control terminal 11 of a writer 12 which is able to actually reproduce at any instant only black or white brightness values.

It will be understood that the above description of the present invention is susceptible to various modifications, changes and adaptations, and the same are intended to be comprehended within the meaning and range of equivalents of the appended claims.

We claim:

1. In apparatus for electrically transmitting pictures containing black, white and gray brightness values by effecting at the transmitting end, a line-by-line photoelectric scanning of the picture to be transmitted to produce a scanning voltage proportional to the brightness value at each scanning instant, and controlling at the receiving end, a device for reproducing the picture, which device is capable of reproducing only a black or white brightness value at any given instant, the improvement comprising: means for quantizing the amplitudes of the scanning voltage, at the transmitting end, at successive intervals into a white range containing the low voltage amplitudes, a black range containing the high voltage amplitudes, and at least one gray range disposed between the white range and the black range and containing the medium voltage amplitudes corresponding to the gray values of the picture to be transmitted; means for producing a signal identifying the particular range existing during each interval means for; transmitting each signal to the receiving end; and, at the receiver end: evaluator means connected for receiving the transmitted signals and deriving from each such signal a direct voltage value representative of the value of such signal; a plurality of pulse generators connected to said evaluator means and each response to only one direct voltage value corresponding to a respective gray range for producing a particular pulse sequence each time such direct voltage value is received, the ratio of pulse duration to pulse interval of the sequence produced by each said generator being proportional to the amplitude of the scanning voltages in the range corresponding to the direct voltage to which it is responsive; switching means connected to said evaluator means for producing a first direct voltage when the direct voltage produced by said evaluator means corresponds to the white range scanned voltages and for producing a second direct voltage when the direct voltage produced by said evaluator means corresponds to the black range scanned voltages; and means connecting the outputs of said pulse generators and said switching means to the picture reproducing device.

* * * * *